(12) United States Patent
Byxbe et al.

(10) Patent No.: US 11,545,037 B2
(45) Date of Patent: Jan. 3, 2023

(54) RUNWAY OVERRUN AWARENESS ALERTING SYSTEM WITH TRENDING INDICATOR

(71) Applicant: Rockwell Collins, Inc., Cedar Rapids, IA (US)

(72) Inventors: Valerie R. Byxbe, Cedar Rapids, IA (US); Darin M. Underwood, Cedar Rapids, IA (US); Tony Vander Velden, Cedar Rapids, IA (US); Taylor Martin, Cedar Rapids, IA (US); Bernard S. McCaffrey, Cedar Rapids, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 211 days.

(21) Appl. No.: 16/939,600

(22) Filed: Jul. 27, 2020

(65) Prior Publication Data

US 2022/0028281 A1     Jan. 27, 2022

(51) Int. Cl.
*G08G 5/00*     (2006.01)
*G08G 5/02*     (2006.01)

(52) U.S. Cl.
CPC .......... *G08G 5/0021* (2013.01); *G08G 5/003* (2013.01); *G08G 5/0013* (2013.01); *G08G 5/0043* (2013.01); *G08G 5/0078* (2013.01); *G08G 5/025* (2013.01)

(58) Field of Classification Search
CPC .... G08G 5/0021; G08G 5/0013; G08G 5/003; G08G 5/0043; G08G 5/0078; G08G 5/025
See application file for complete search history.

(56) References Cited

U.S. PATENT DOCUMENTS

| 9,008,873 | B1  | 4/2015  | Phillips et al. |
| 9,221,554 | B2* | 12/2015 | Horne ................. G08G 5/0021 |
| 9,399,524 | B2  | 7/2016  | He et al. |

(Continued)

FOREIGN PATENT DOCUMENTS

EP     3636543 A1     4/2020

OTHER PUBLICATIONS

Extended Search Report for European Application No. 21187986.1 dated Nov. 19, 2021, 10 pages.

*Primary Examiner* — Hunter B Lonsberry
*Assistant Examiner* — Elizabeth Yang
(74) *Attorney, Agent, or Firm* — Suiter Swantz pc llo

(57) ABSTRACT

An aircraft-based runway overrun awareness alerting system (ROAAS) for an aircraft primary flight display (PFD) is disclosed. In embodiments, the ROAAS is embodied aboard an aircraft and tracks trends in the aircraft position and heading. Further, the ROAAS tracks the trending energy state of the aircraft on approach to a runway. Based on the current energy state, as well as the runway parameters, the ROAAS predicts a landing point for the aircraft along the runway as a trend based on the evolving energy state and position of the aircraft. Based on the landing point trend, as well as the energy state, the ROAAS determines the current likelihood of runway excursion as an evolving trend (e.g., that the aircraft will not have sufficient runway remaining to decelerate or stop) and displays this likelihood as a dynamic graphic element not integrated into any other instruments or components displayed by the PFD.

10 Claims, 6 Drawing Sheets

(56) References Cited

U.S. PATENT DOCUMENTS

| | | |
|---|---|---|
| 9,499,279 B2 | 11/2016 | He et al. |
| 9,527,601 B2 | 12/2016 | Wyatt et al. |
| 10,214,300 B2 | 2/2019 | Feyereisen et al. |
| 10,518,897 B2 | 12/2019 | Charbonnier et al. |
| 2014/0257601 A1 | 9/2014 | Horne et al. |
| 2015/0120098 A1* | 4/2015 | Catalfamo ........... G08G 5/0021 701/16 |
| 2017/0275020 A1 | 9/2017 | Charbonnier et al. |
| 2018/0127111 A1* | 5/2018 | Feyereisen ............. G01C 23/00 |
| 2020/0013295 A1* | 1/2020 | Moravek .............. G05D 1/0676 |
| 2020/0150689 A1 | 5/2020 | Khatwa et al. |
| 2020/0168108 A1* | 5/2020 | Letsu-Dake ......... G08G 5/0013 |

\* cited by examiner

RUNWAY OVERRUN AWARENESS ALERTING SYSTEM WITH TRENDING INDICATOR

CROSS-REFERENCE TO RELATED APPLICATIONS

The instant application is related to, and herein incorporates by reference in its entirety, the concurrently filed U.S. patent application Ser. No. 16/939,770.

TECHNICAL FIELD

The subject matter disclosed herein is directed generally to aircraft display systems and more particularly to symbology for primary flight displays (PFD).

BACKGROUND

Runway overruns are a threat to aircraft landing on, or taking off from, an airport runway. For example, an aircraft on approach to a runway at a given airspeed and angle of attack (which in turn may be affected by winds over the runway and other external factors) will touch down at a particular point along the runway. If there is not enough runway remaining between this landing point and the end of the runway for the aircraft to decelerate after touchdown, overrun may result: the aircraft may exit the runway at its far end, resulting in damage to the aircraft, injury to passengers and crew, or worse. Conventional runway overrun prevention systems provide visual and/or aural warnings of a potential excursion, but these systems may integrate visual warnings into an already complex primary flight display (PFD) or navigational display.

SUMMARY

An aircraft-based runway overrun awareness alerting system (ROAAS) is disclosed. In embodiments, the ROAAS determines sequential position states of the aircraft as it approaches a runway for landing, tracking the trending position and heading of the aircraft relative to the runway. The ROAAS acquires information about the runway (e.g., length, orientation) from the aircraft flight management system (FMS) or from ground control. The ROAAS uses data from the FMS and onboard sensors and instruments to track the trending energy state of the aircraft, e.g., its airspeed, angle of attack, overall kinetic energy. Based on the aircraft energy states and position states relative to the runway, the ROAAS predicts a point on the runway where the aircraft is likely to touch down (and whether, given the energy states and position states, the predicted landing point is trending forward or backward relative to the runway). Based on the trending energy states, position states, and predicted landing point, the ROAAS forecasts whether the aircraft is trending toward or away from a runway overrun or excursion (e.g., based on the likely landing point, the probability that the aircraft will not be able to stop before reaching the end of the runway). The ROAAS includes a display component that presents the trending runway overrun probability within the primary flight display (PFD) as a dynamic graphic element continually changing in appearance to reflect trending away from or toward overrun. The graphic element is separate from other PFD components and navigational instruments.

In some embodiments, the dynamic graphic element is revised based on revisions to the trending overrun probability.

In some embodiments, the ROAAS determines trending position states of the aircraft based on information received from the aircraft flight management system (FMS), from onboard sensors, or from the engine indicator and crew alerting system (EICAS).

In some embodiments, the ROAAS determines trending energy states of the aircraft based on data received from the FMS, the onboard sensors, or the EICAS.

In some embodiments, the ROAAS receives runway data from the runway's ground control station or from some other source external to the aircraft.

In some embodiments, the aircraft display system includes synthetic vision system (SVS) or enhanced vision system (EVS) content displaying the environment in the vicinity of the runway (e.g., from the aircraft's perspective). The display system superimposes the PFD, other navigational instrumentation, and the dynamic graphic element over the SVS/EVS content.

In some embodiments, the dynamic graphic element includes dynamic shape and color components (e.g., the current predicted trend corresponding to the current color and/or shape).

In some embodiments, revisions in the predicted trend are indicated by a change in the shape, size, and/or color of the dynamic graphic element.

In some embodiments, the dynamic graphic element changes shape or size in unison with the color change.

In some embodiments, the dynamic graphic element is displayed within a region of the display surface not otherwise occupied by a displayed PFD component or navigational instrument.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
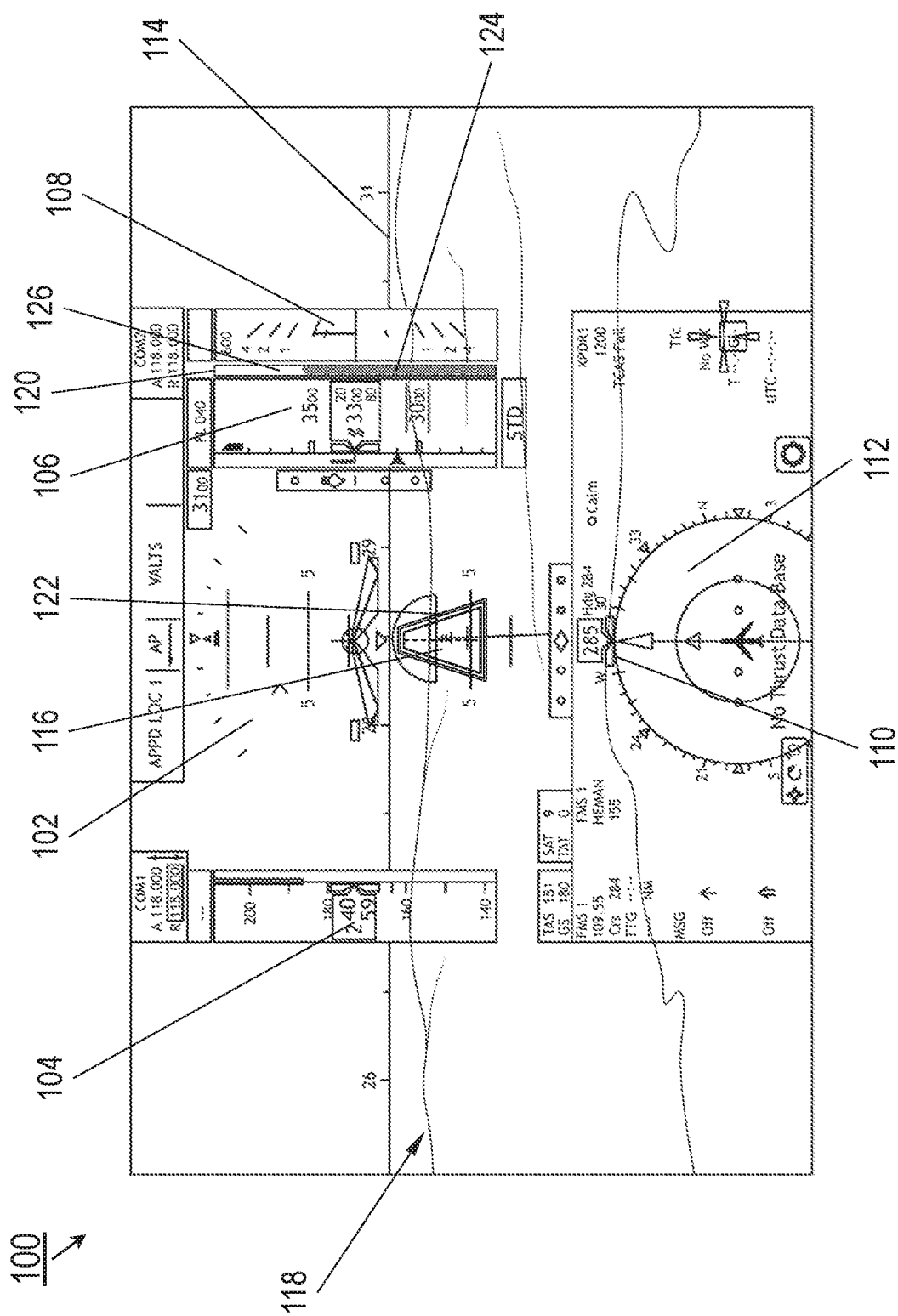
FIG. 1 is a block diagram illustrating a primary flight display (PFD) incorporating a runway overrun awareness alert system (ROAAS) according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring to FIG. 1, a primary flight display (PFD) 100 is disclosed. The PFD 100 may include attitude indicator 102, airspeed indicator 104, altimeter 106, vertical speed indicator 108, turn coordinator 110, horizontal situation indicator 112, and artificial horizon 114.

In embodiments, the PFD 100 may be embodied aboard an aircraft on approach to a runway 116. For example, the PFD 100 may incorporate, or may be a display component of, an enhanced vision system (EVS) and/or a synthetic vision system (SVS), such that aircraft instruments and/or PFD components (e.g., the attitude indicator 102, airspeed indicator 104, altimeter 106, vertical speed indicator 108, turn coordinator 110, horizontal situation indicator 112, and artificial horizon 114) are graphically superimposed over an enhanced-vision representation 118 of the environment surrounding the runway 116 (including, e.g., terrain, runway or airport facilities, and explanatory symbology noting natural or manmade features or proximate aircraft).

While the aircraft on approach to the runway 116, the pilot may be monitoring multiple indicators simultaneously while controlling the descent of the aircraft. The energy state of the aircraft may similarly be in constant flux from moment to moment, based on, e.g., the current airspeed, altitude, angle of attack, or factors external to the aircraft, such as shifting wind patterns over the runway 116. Accordingly, the pilot may be aiming for a particular landing point or region of the runway 116 in order to allow sufficient runway to decelerate or stop after touching down, but the actual likelihood of achieving the intended landing point (e.g., as opposed to leaving insufficient runway and risking a runway excursion or overrun) may vary along with internal and external conditions.

In embodiments, the PFD 100 may incorporate a runway overrun awareness alert system 120 (ROAAS). For example, while on approach to the runway 116, the ROAAS 120 may monitor the trending energy state of the aircraft along with its trending position and heading relative to the runway compared with the parameters of the runway itself (e.g., the length and orientation of the runway, environmental conditions that may affect the landing). In embodiments, while on approach to the runway 116, the ROAAS 120 may monitor the energy state of the aircraft along with its position and heading relative to the runway and the parameters of the runway itself (e.g., length, orientation, weather or environmental conditions). If, for example, one or more conditions or combinations of conditions meet or exceed predetermined threshold levels, the display of ROAAS symbology may be triggered. By way of a non-limiting example, the aircraft state may indicate an angle of attack consistent with approach and landing, but airspeed may be in excess of a speed consistent with the current aircraft position relative to the runway, and a tailwind may be present. Based on these observations, the ROAAS 120 may conclude that the likelihood of a runway overrun is nonzero, and that the threshold for ROAAS symbology display has been crossed. Should the aircraft abort the attempted landing and go around for a subsequent attempt, the ROAAS 120 may conclude that display conditions no longer exist and cease display of ROAAS symbology.

In embodiments, based on trends in the aircraft energy state, the ROAAS 120 may predict an evolving trend in the likely landing point of the aircraft relative to the runway 116. Based on the trending landing point and aircraft energy state, the ROAAS 120 may further predict the likely trend toward, or away from, a runway excursion or overrun on the part of the aircraft. The ROAAS 120 may send the predicted likelihood back to the EVS/SVS system for display to the pilot via the PFD 100. For example, while the PDF 100 may incorporate runway excursion warnings, these warnings may only serve to warn the pilot of conditions consistent with a likely excursion when these conditions already exist (as opposed to, e.g., proactive prevention of excursion conditions). Further, runway excursion warnings may be incorporated into other display elements of the PDF (e.g., the EVS-generated runway 122 corresponding to the runway 116, which may flash red to warn of a potential excursion) and therefore may not be as quickly and easily digested by the pilot.

It is contemplated that the ROAAS 120 may provide a concise, discrete assessment of trending runway excursion likelihood that the pilot, in conjunction with other data provided by the PFD 100 (e.g., airspeed, angle of attack, altitude), may rapidly assimilate while managing the descent and landing phases. For example, the predictive ability of the ROAAS 120 may be enhanced by more robust runway data (e.g., runway conditions, weather conditions) or even performance data relevant to the aircraft or aircraft type, e.g., prior flight performance during approach and landing phases under similar conditions, braking performance and methods.

In embodiments, the ROAAS 120 may be displayed separate from, and not integrated into, any other instruments, indicators, or SVS/EVS elements displayed by the PDF 100. For example, the graphic representation displayed by the PDF 100 may represent a trend indicator determined by the ROAAS 120 and capable of displaying to the pilot at a glance (e.g., via the pilot's peripheral vision) whether the relationship between the aircraft and the runway 116 is improving (e.g., trending towards a safe landing) or declining (e.g., trending towards a runway overrun). In embodiments, the graphic representation may dynamically change in shape, size, and/or color as the contributing factors (e.g., the aircraft airspeed, angle of attack, and position/heading relative to the runway) driving the trends in position state, energy state, predicted landing point, and overrun probability continuously change.

In embodiments, the ROAAS 120 may be displayed within the PFD 100 as a dynamic vertical bar 124 configured to change appearance in real time to reflect the evolving trend toward or away from runway excursion or overrun. For example, as the energy state of the aircraft trends upward or downward (along with any other external conditions accessible to the ROAAS 120) the ROAAS may display the current excursion likelihood as it trends toward or away from increased certainty of overrun, e.g., by changing the height and/or color of the dynamic vertical bar 124 in real time. For example, the dynamic vertical bar 124 reaching the top of its allotted space 126 may indicate to the pilot conditions consistent with a near-certain runway overrun (and that the pilot's best remaining option may be to abort the landing and fly around for another approach). By displaying a dynamic trend indicator, the ROAAS 120 may present to the pilot at a glance visual feedback as to the effect of his/her actions toward, or away from, a safe landing on the intended runway.

Figure 2:
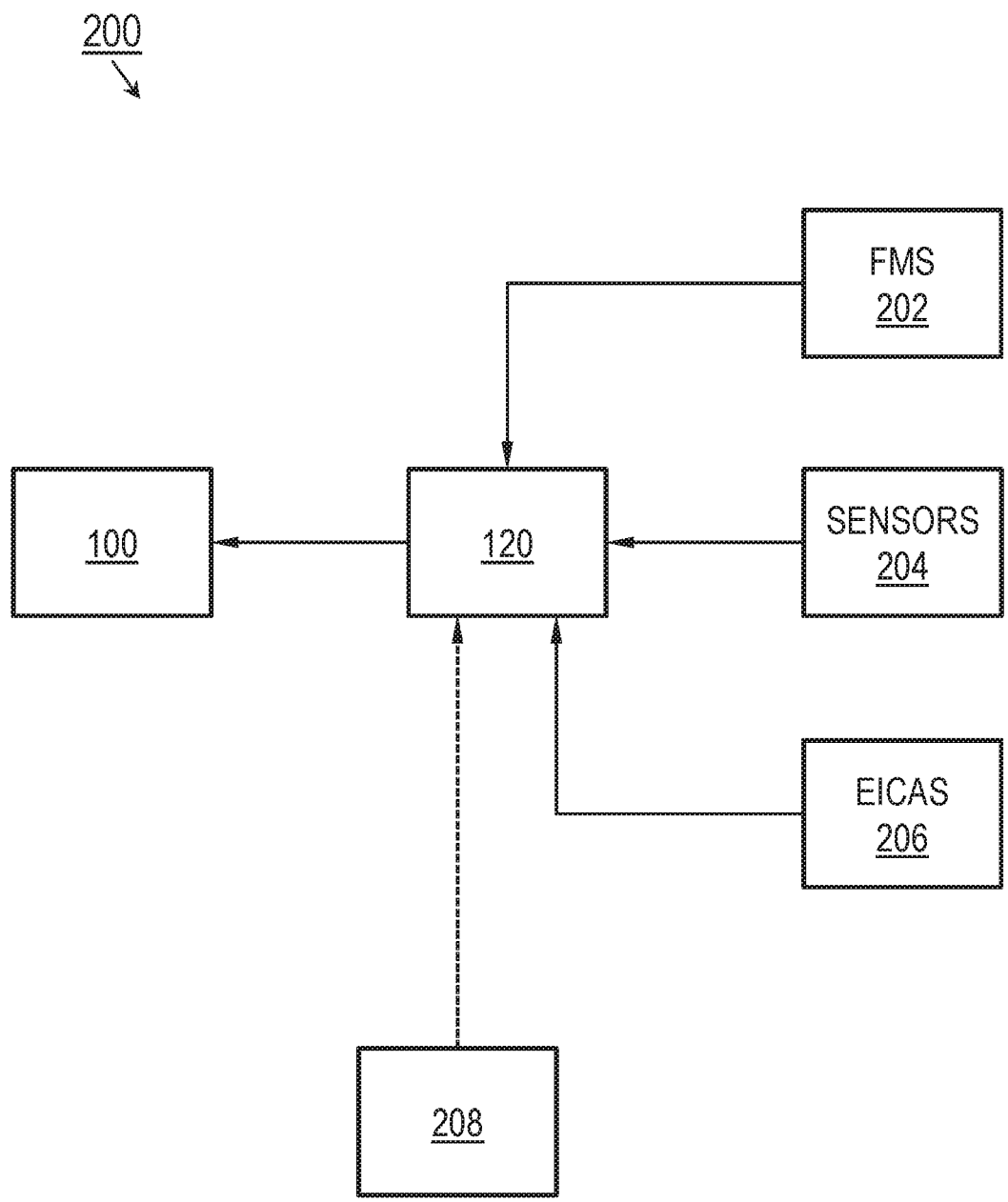
FIG. 2 is a block diagram of the ROAAS of FIG. 1 and embodying aircraft.

Referring to FIG. 2, the aircraft 200 is disclosed. The aircraft 200 may include a flight management system 202 (FMS), aircraft-based sensors 204, and engine indicator/crew alerting system 206 (EICAS).

In embodiments, the ROAAS 120 may be embodied aboard the aircraft 200 and may communicate with other sources, both onboard and external to the aircraft, to receive updated aircraft data. As noted above, the ROAAS 120 may consider multiple data sources and their effect on each other to determine whether display conditions exist and, once display conditions are determined to exist, to continually evaluate whether conditions persist or, for example, have been resolved by pilot action.

For example, the ROAAS 120 may receive continual updates from the flight management system 202 (FMS) with respect to the position of the aircraft and its progress relative to the flight plan of the aircraft (or, e.g., relative to the current flight segment or phase). Further, the FMS 202 may provide runway, instrument approach, beacon or waypoint data, and other navigational database data to the ROAAS 120.

In embodiments, the ROAAS 120 may receive additional aircraft performance data from aircraft-based sensors 204 (e.g., airspeed indicators, altimeters, angle of attack sensors, barometers) and engine indicator/crew alerting systems 206 (EICAS). For example, the EICAS 206 may provide updates as to the current and evolving states of aircraft engines, fuel systems, hydraulic and pneumatic systems, and aircraft components not in direct communication with navigation systems but whose performance regardless may affect the energy state of the aircraft.

In embodiments, the ROAAS 120 may receive some information from external sources 208 not onboard the aircraft. For example, the ROAAS 120 may receive position, runway, or weather data from ground-based facilities (e.g., wind pattern data measured by ground facilities proximate to the runway 116).

In embodiments, based on a continual evaluation of these diverse data sources, the ROAAS 120 may determine that conditions exist that warrant display of the ROAAS symbology within the PFD 100. For example, the ROAAS 120 may be displayed as long as these conditions continue to exist (e.g., until the aircraft has touched down or remedial action on the part of the pilot or crew sufficiently changes the observed conditions).

Figure 3A:
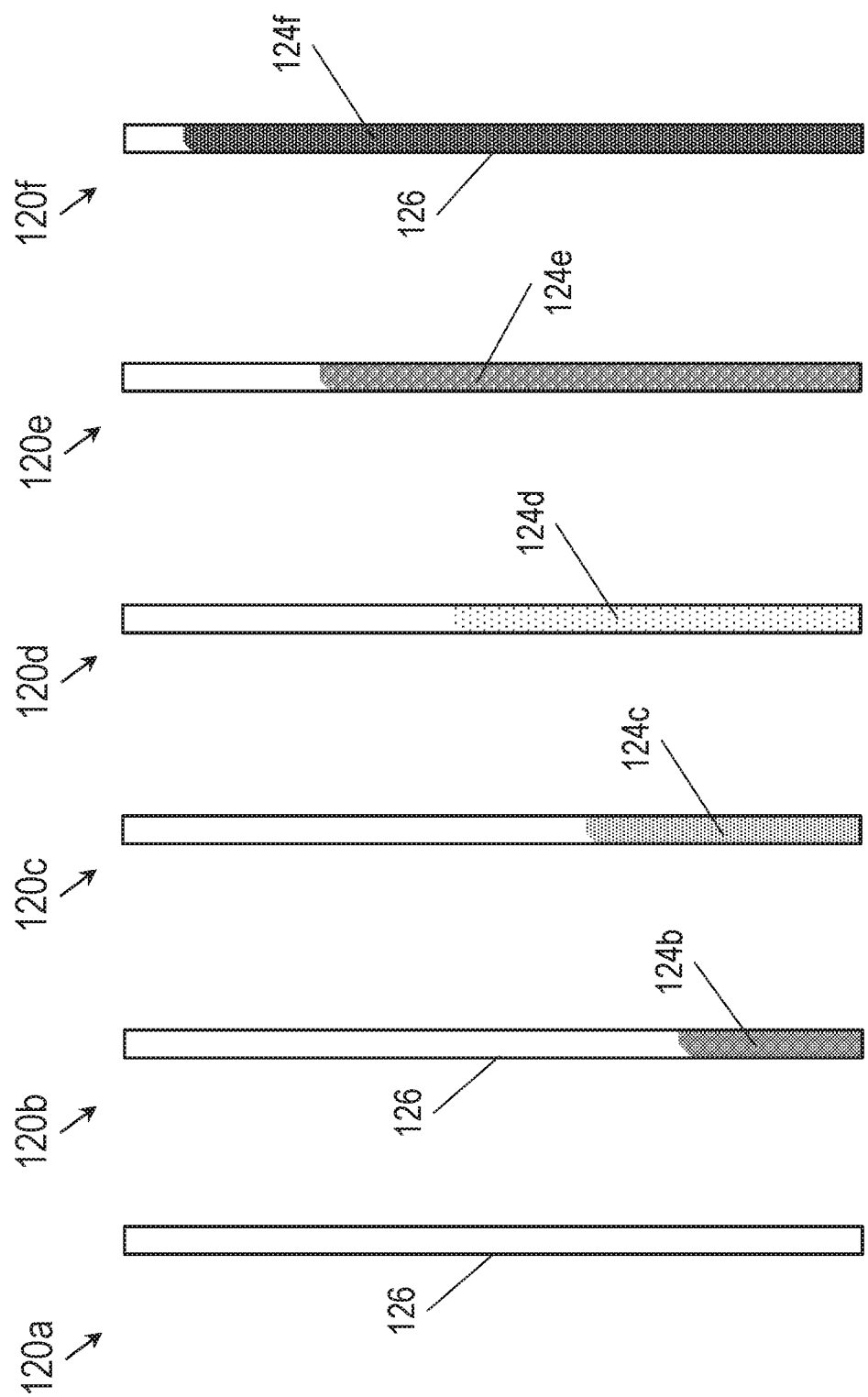
FIGS. 3A and 3B illustrate components and operations of the ROAAS of FIG. 1.

Referring to FIG. 3A, the ROAAS 120a-f, similarly to the ROAAS 120 of FIG. 1, may incorporate dynamic shape and color changes to indicate trending toward or away from a certain runway excursion or overrun on the part of the aircraft (200, FIG. 2).

In embodiments, the dynamic vertical bars 124b-f of the respective ROAAS 120a-f may be situated within their allotted spaces 126 (e.g., as drawn or otherwise displayed by the EVS/SVS system onto the PFD (100, FIG. 1). For example, the ROAAS 120a may be displayed when the likelihood of runway excursion is nominally zero, e.g., when the aircraft 200 is not on approach. In embodiments, the ROAAS 120a may be displayed as an allotted space 126 without a visible dynamic vertical bar 124.

In embodiments, the ROAAS 120b may be displayed within the PFD 100 to indicate a trend toward a possible runway excursion, e.g., predicted landing points of the aircraft 200 where the actual likelihood of excursion or overrun may be slight but no longer nonzero. For example, the dynamic vertical bar may rise (124b) but to a relatively low height (e.g., relative to the full height of the allotted space 126) and may be rendered in a green or greenish color to indicate to the pilot a change of state relative to the ROAAS 120a, e.g., predicted landing points within acceptable distance of the end of the runway and thus a likelihood of runway excursion that remains relatively low (and may not yet indicate remedial action), but wherein the likelihood of excursion may continue to trend upward if corrective action is not taken.

In embodiments, the ROAAS 120c-d may represent further changes in state from the ROAAS 120b, e.g., if the predicted landing points continue to trend into a part of the runway where the likelihood of overrun is more probable. For example, the ROAAS 120c may include a dynamic vertical bar 124c increasing in height and gradually shading in color from green to yellow (e.g., yellow-green, green-yellow) to indicate an upward trending likelihood of excursion. Similarly, the ROAAS 120d may include a still higher dynamic vertical bar 124d of a substantially yellow color.

In embodiments, the ROAAS 120e-f may indicate continued upward trends in the likelihood of excursion. For example, the dynamic vertical bar 124e of the ROAAS 120e may further increase in height and shade from yellow to red (e.g., red-orange, orange-red), indicating the gradually increasing likelihood of runway excursion. When the ROAAS 120f is displayed, the dynamic vertical bar 124f may be at or near its maximum height relative to its allotted space 126, and may be colored fully red to indicate a likelihood of runway excursion nearing certainty, and that may warrant either a runway excursion alert or immediate corrective action on the part of the pilot.

Figure 3B:
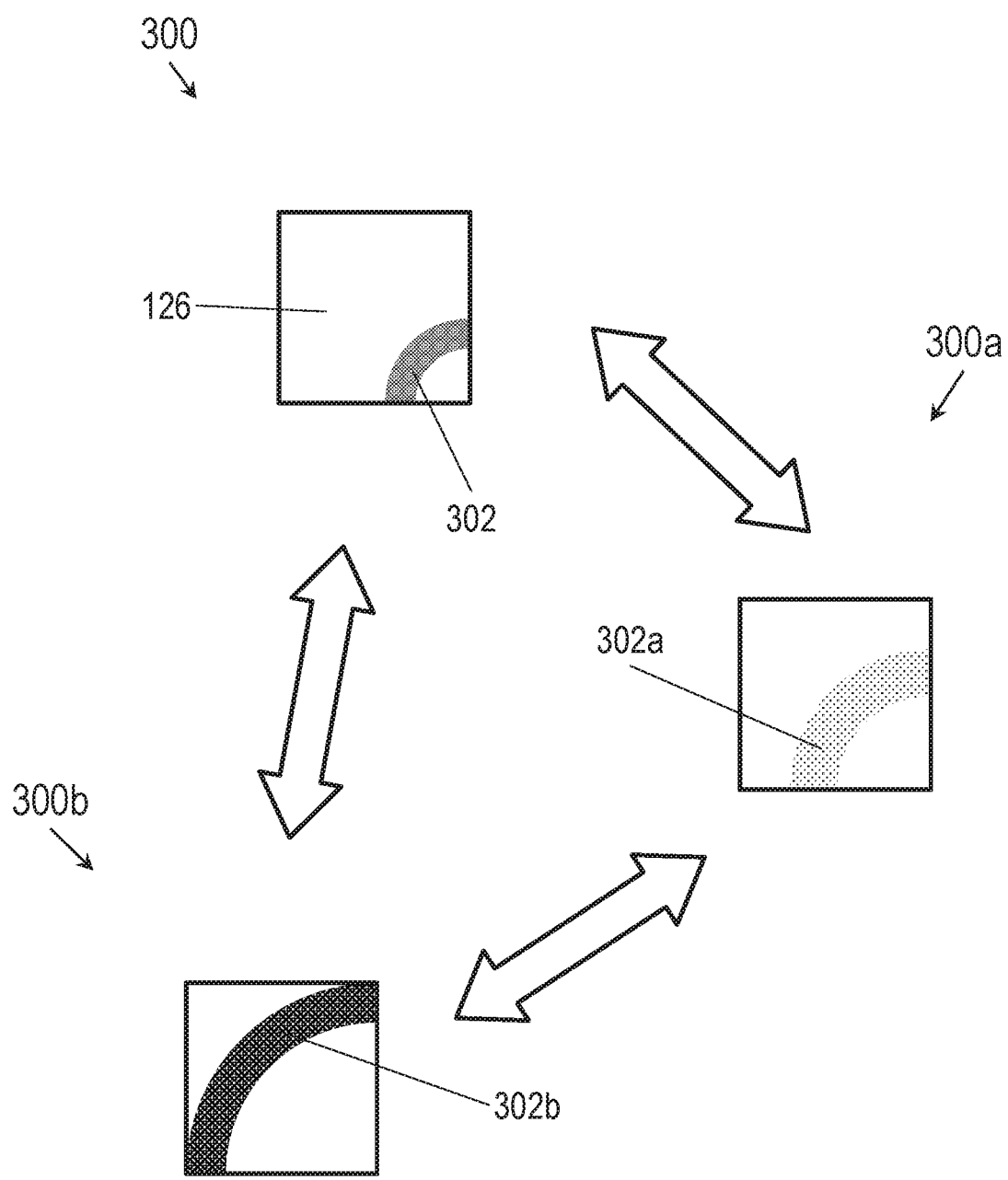

Referring now to FIG. 3B, the ROAAS 300 may be implemented and may function similarly to the ROAAS 120, 120a-f of FIGS. 1 through 3A, except that the ROAAS 300 and/or its component symbologies may be condensed or otherwise altered for some configurations of PFD (100, FIG. 1), e.g., condensed PFD with less available free space than the PFD 100. In embodiments, the ROAAS 120, 300 may be represented by any other appropriate graphic combinations of real-time dynamic shape and color changes not explicitly disclosed herein.

In embodiments, the ROAAS 300 may display the trending likelihood of runway excursion as a dynamic arc 302 that, similarly to the dynamic vertical bar (124, 124b-f) of the ROAAS 120, 120a-f, changes color and shape in real time within its allotted space 126 to reflect upward and downward trends of the likelihood of runway excursion by the aircraft (200, FIG. 2) (e.g., toward or away from a certain runway excursion or overrun). For example, the ROAAS 300 may represent relatively low excursion probabilities as a green arc of relatively small size (e.g., proximate to the center of the arc).

In embodiments, the ROAAS 300a-b may be implemented and may function similarly to the ROAAS 300, but may respectively reflect landing points trending toward an increasingly more probable runway excursion. For example, the dynamic arc 302 of the ROAAS 300 may grow into a larger arc 302a shading toward yellow, as the ROAAS 300a indicates a growing likelihood of excursion, and a still larger arc 302b shading toward red as the ROAAS 300b indicates likely landing points trending toward near certain excursion. In some embodiments, the ROAAS 300a may shift back toward the smaller, greener dynamic arc 300 of the ROAAS 300, e.g., if corrective action is taken causing the predicted landing points to trend away from runway excursion.

Figure 4A:
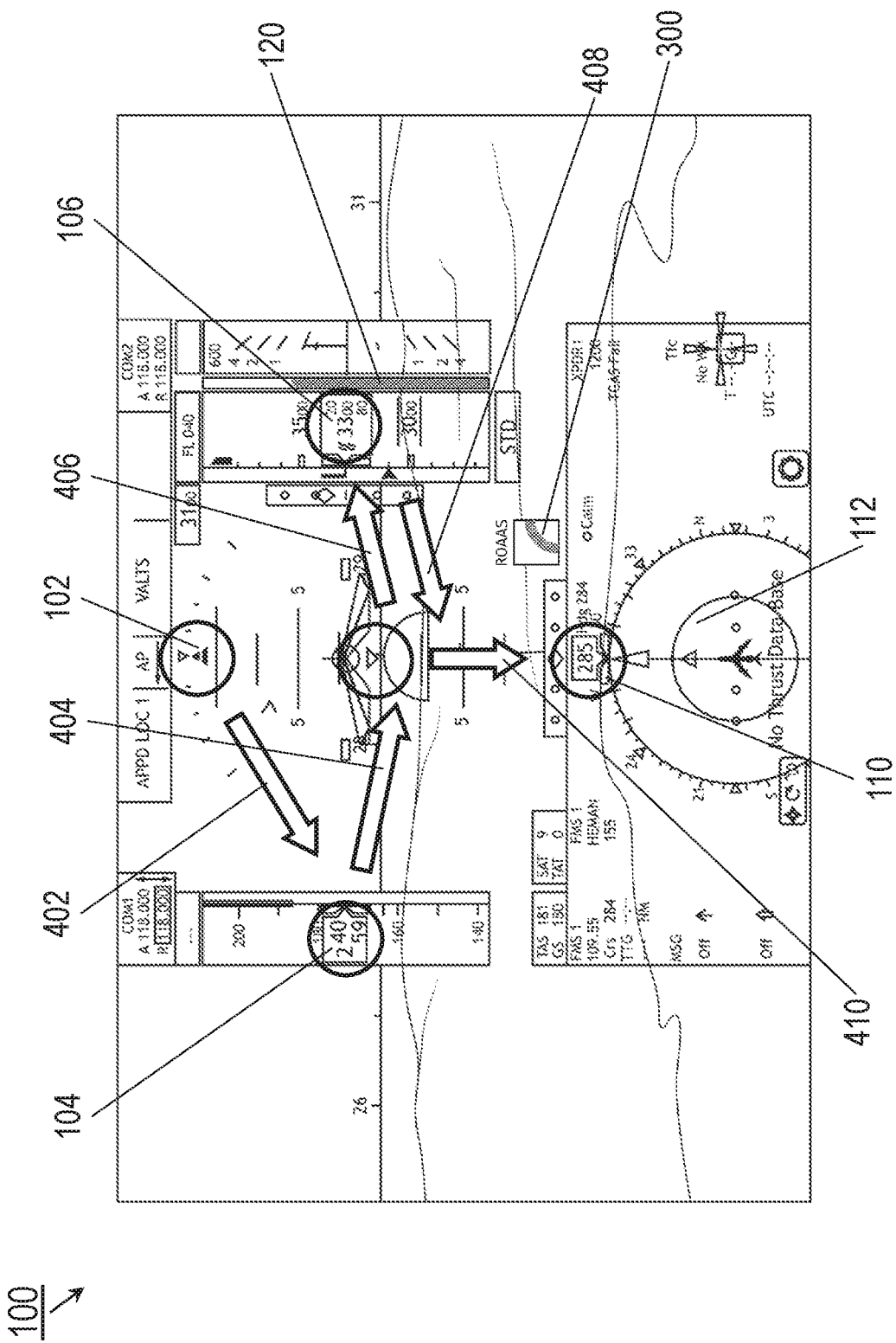
FIG. 4A is an illustration of scanning patterns for the PFD of FIG. 1.

Referring to FIG. 4A, the PFD 100 is disclosed.

In embodiments, the ROAAS 120, 300 of FIGS. 1 through 3B may be displayed in an area of the PFD 100 not otherwise dedicated to aircraft instruments or to PFD components. For example, the placement of the ROAAS 120, 300 may be based on observed pilot scan patterns of the PFD 100. It is contemplated that the pilot may construct a multidimensional model of the aircraft energy state in real time, based on multiple discrete and easily assimilated data points. Based on this evolving real time model, the pilot may make more informed decisions regarding, e.g., whether to continue or abort a landing or descent in progress (and if to abort, at what point to do so). For example, the pilot's scanning pattern with respect to the PFD may include starting at the attitude indicator 102 to check pitch and roll information, scanning left (402) to check the airspeed indicator 104, scanning center (404) and then right (406) to monitor the altimeter 106, returning to center (408) and then scanning down (410) to the turn coordinator 110 and horizontal situation indicator 112. In embodiments, the ROAAS 120, 300 may be positioned relative to the PFD 100 such that the ROAAS appears at the periphery of the pilot's scan pattern where its information may be easily captured in the pilot's peripheral vision.

Figure 4B:
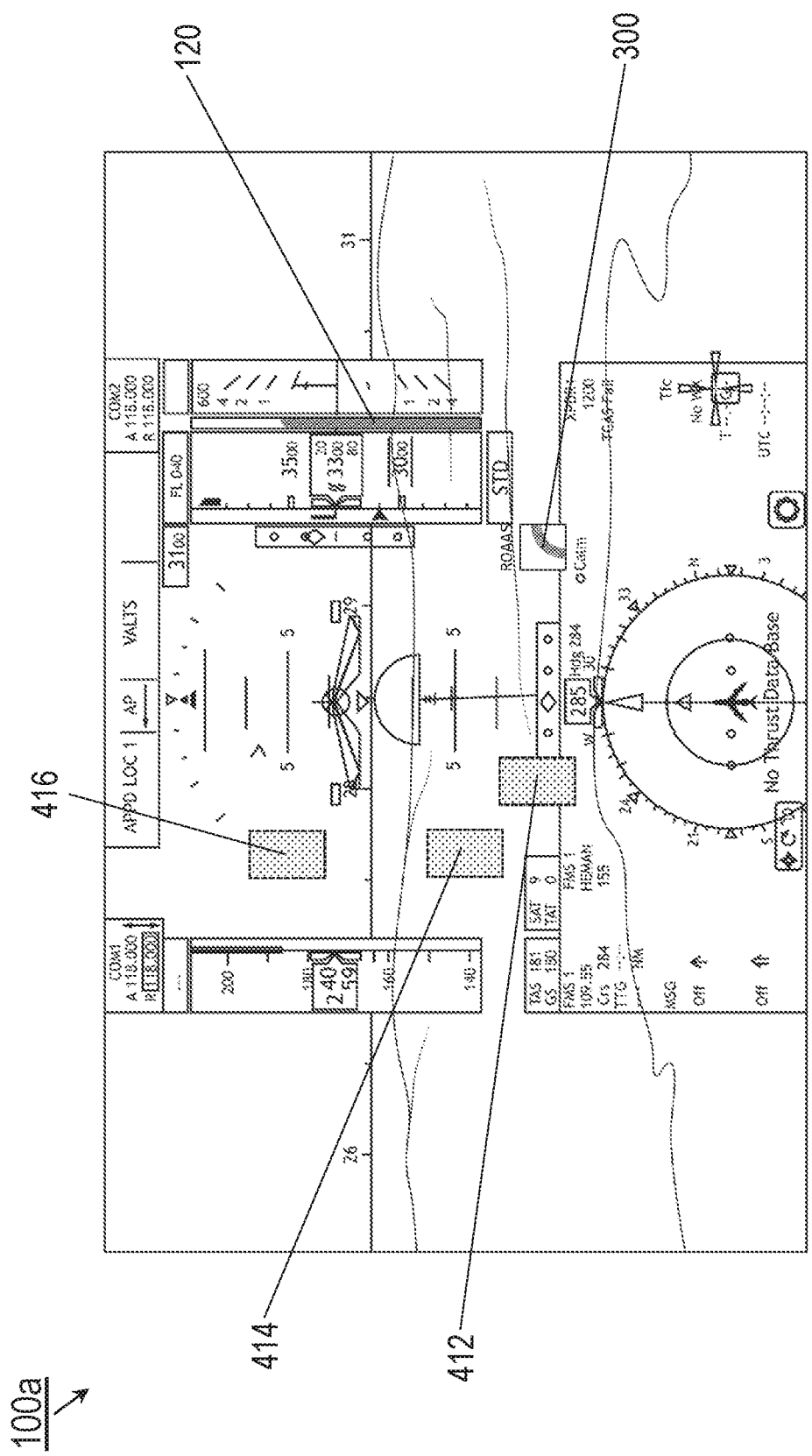
FIG. 4B is an illustration of alternative placements of the ROAAS of FIG. 1 within the PFD.

Referring also to FIG. 4B, the PFD 100a may be implemented and may function similarly to the PFD 100 of FIGS. 1 through 4A, except that the ROAAS 120, 300 may be displayed in other otherwise undedicated areas (412, 414, 416) of the PFD. In embodiments, the ROAAS 120, 300 may be positioned in other parts within the PFD 100a that may fall within the periphery of the pilot's scan pattern.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. An aircraft-based runway overrun awareness alerting system, comprising:

one or more processors installable aboard an aircraft and configured for:

determining one or more sequential position states corresponding to the aircraft, each position state associated with an inflight position of the aircraft and a direction of the aircraft;

determining one or more runway attributes corresponding to a runway proximate to the aircraft;

determining one or more sequential energy states of the aircraft, wherein the one or more energy states includes an angle of attack and an airspeed;

predicting, based on the one or more position states, the one or more energy states, and the one or more runway attributes, a landing point on the proximate runway;

predicting, based on at least the landing point and the one or more energy states, a runway overrun probability; and revising at least one of the landing point or the runway overrun probability based on one or more of a change in the one or more position states or a change in the one or more energy states;

and at least one display device in communication with the one or more processors, the display device configured to:

display, within a display surface, one or more primary flight display (PFD) components and navigational instruments corresponding to the aircraft;

and display at least one dynamic graphic representation corresponding to the runway overrun probability, wherein the dynamic graphic representation is not integrated with the one or more of the PFD components and the navigational instruments, wherein the dynamic graphic representation comprises a dynamic shape, wherein a size of the dynamic shape directly indicates the runway overrun probability, wherein a change in the shape of the dynamic shape directly indicates a change in the runway overrun probability.

2. The aircraft-based runway overrun awareness alerting system of claim 1, wherein the at least one display device is configured to revise the dynamic graphic representation based on the runway overrun probability.

3. The aircraft-based runway overrun awareness alerting system of claim 1, wherein the one or more processors are configured to determine the one or more position states based on position information received from one or more of an aircraft sensor, a flight management system (FMS), and an engine indicator and crew alerting system (EICAS).

4. The aircraft-based runway overrun awareness alerting system of claim 1, wherein the one or more processors are configured to determine the energy state based on data received from one or more of an aircraft sensor, a flight management system (FMS), and an engine indicator and crew alerting system (EICAS).

5. The aircraft-based runway overrun awareness alerting system of claim 1, wherein the one or more processors are configured to receive the one or more runway attributes from at least one source external to the aircraft.

6. The aircraft-based runway overrun awareness alerting system of claim 1, wherein the display device is configured to:

generate at least one of a synthetic vision display or an enhanced vision display associated with an environment proximate to the runway; and
superimpose the one or more of the PFD components, the navigational instruments, and the dynamic graphic representation over the synthetic vision display or the enhanced vision display.

7. The aircraft-based runway overrun awareness alerting system of claim 1, wherein the dynamic graphic representation comprises the dynamic shape and a color element.

8. The aircraft-based runway overrun awareness alerting system of claim 7, wherein the revising of the runway overrun probability corresponds to:

a size change of the dynamic shape; and
a color change of the color element.

9. The aircraft-based runway overrun awareness alerting system of claim 8, wherein the size change corresponds to the color change.

10. The aircraft-based runway overrun awareness alerting system of claim 1, wherein the at least one display device is configured to display the dynamic graphic representation within at least one region of the display surface not including a displayed PFD component or navigational instrument.

* * * * *